United States Patent [19]
Chen

[11] Patent Number: 6,000,769
[45] Date of Patent: Dec. 14, 1999

[54] COMPUTER FRONT COVER MOUNTING ARRANGEMENT

[75] Inventor: Chih-Yao Chen, Hsinchu, Taiwan

[73] Assignee: Enlight Corporation, Taoyuan Hsien, Taiwan

[21] Appl. No.: 09/177,663

[22] Filed: Oct. 22, 1998

[51] Int. Cl.⁶ .................................................. A47B 81/00
[52] U.S. Cl. .......................... 312/223.2; 312/329; 16/232; 220/817; 70/168
[58] Field of Search ................................ 70/DIG. 63, 161, 70/168; 292/DIG. 17; 361/726; 49/192, 246, 382; 16/229, 230, 231, 232; 312/223.1, 223.2, 324, 326, 329, 215, 213, 265.5, 265.6; 220/810, 817, 843, 844

[56] References Cited

U.S. PATENT DOCUMENTS

| | | | |
|---|---|---|---|
| 5,447,367 | 9/1995 | Wei | 312/223.2 |
| 5,530,992 | 7/1996 | Baermann | 49/382 X |
| 5,547,272 | 8/1996 | Paterson et al. | 312/223.2 |
| 5,675,934 | 10/1997 | Park | 16/232 X |
| 5,701,231 | 12/1997 | Do et al. | 312/223.2 X |
| 5,896,273 | 4/1999 | Varghese et al. | 312/223.2 X |

FOREIGN PATENT DOCUMENTS 1264625  5/1961  France ..................................... 16/231

*Primary Examiner*—Janet M. Wilkins
*Attorney, Agent, or Firm*—Pro-Techtor International Services

[57] ABSTRACT

A computer front cover mounting arrangement includes two doorposts fixedly fastened to two opposite vertical lateral sides of the face panel of a computer mainframe, each door post having two pivot shafts at top and bottom sides, and a front cover releasably coupled to the doorposts and covered on the face panel and selectively openable from the face panel from the left side or the right side, the front cover having backward coupling flanges in four corners, each coupling flange having a circular recess for coupling with one pivot shaft, and a guide groove for guiding the corresponding pivot shaft into coupling position.

4 Claims, 6 Drawing Sheets

COMPUTER FRONT COVER MOUNTING ARRANGEMENT

BACKGROUND OF THE INVENTION

The present invention relates to a computer front cover mounting arrangement which comprises a computer mainframe having a face panel, and a front cover covered on the face panel to protect the face panel against dust and thieves. The front cover can be opened from the face panel from the left side or the right side as desired.

In order to protect the face panel of a computer against dust and thieves, an additional front cover may be provided. However, when a front cover is installed, it can only be turned between the closed position and the opened position from one side, i.e., from the left side or the right side only.

SUMMARY OF THE INVENTION

It is one object of the present invention to provide a computer front cover mounting arrangement which enables the front cover to be conveniently removed from the computer. It is another object of the present invention to provide a computer front cover mounting arrangement which enables the front cover to be selectively opened from the computer from the left side or the right side as desired. A computer front cover mounting according to the preferred embodiment of the present invention is comprised of a face panel fixedly mounted on a front side of a computer mainframe, a front cover covered on the face panel and turned between a first position where the front cover is closed on the face panel and a second position where the front cover is opened from the face panel, and lock means controlled to lock the front cover. The front cover comprises four backward coupling flanges respectively disposed in four corners of a back side thereof, a plurality of transverse ornamental ribs arranged at a front side thereof at different elevations. The backward coupling flanges each comprise a horizontal guide groove, a mouth at an outer end of the horizontal guide groove, and a circular recess at an inner end of the horizontal guide groove remote from the mouth. The circular recess has a vertical peripheral wall at an inner side remote from the horizontal guide groove and a bearing surface. The guide groove has an outer end terminating in the mouth and an inner end terminating in the circular recess. The face panel comprises two doorposts disposed in parallel at two opposite vertical lateral sides thereof. The doorposts each comprise two vertical pivot shafts respectively raised from top and bottom sides thereof in reversed directions for insertion through the mouths at the coupling flanges of the front cover into the respective circular recesses, and a plurality of finger recess through which fingers are inserted to open the front cover from the face panel. The pivot shafts of the doorposts each have a peripheral notch, and a convex top face respectively coupled to the bearing surfaces of the circular recesses at the coupling flanges of the front cover.

DETAILED DESCRIPTION OF THE PREFERRED EMBODIMENT

Figure 1:
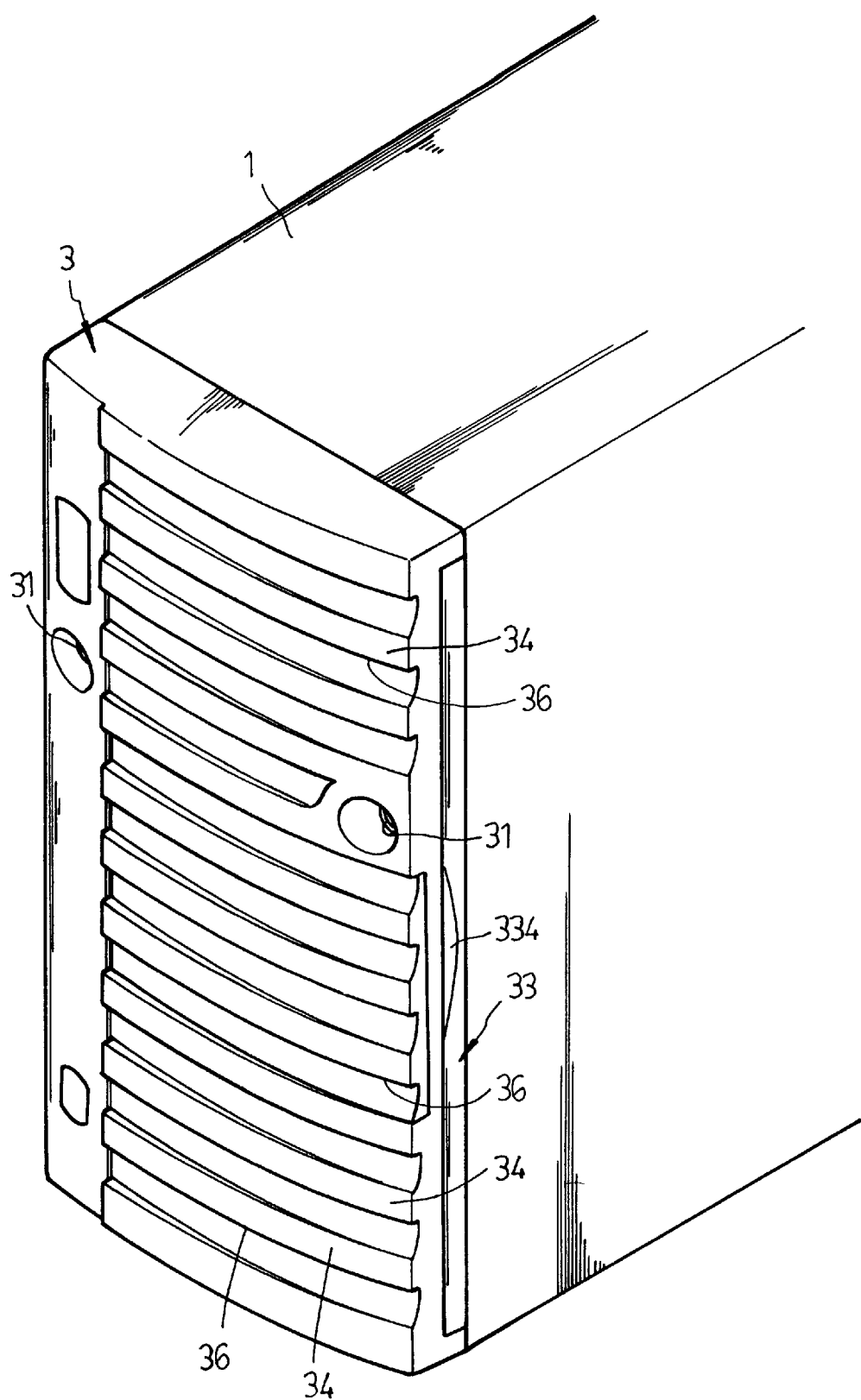
FIG. 1 is a perspective view of the present invention, showing the front cover closed on the face panel of the computer mainframe and locked.
Figure 2:
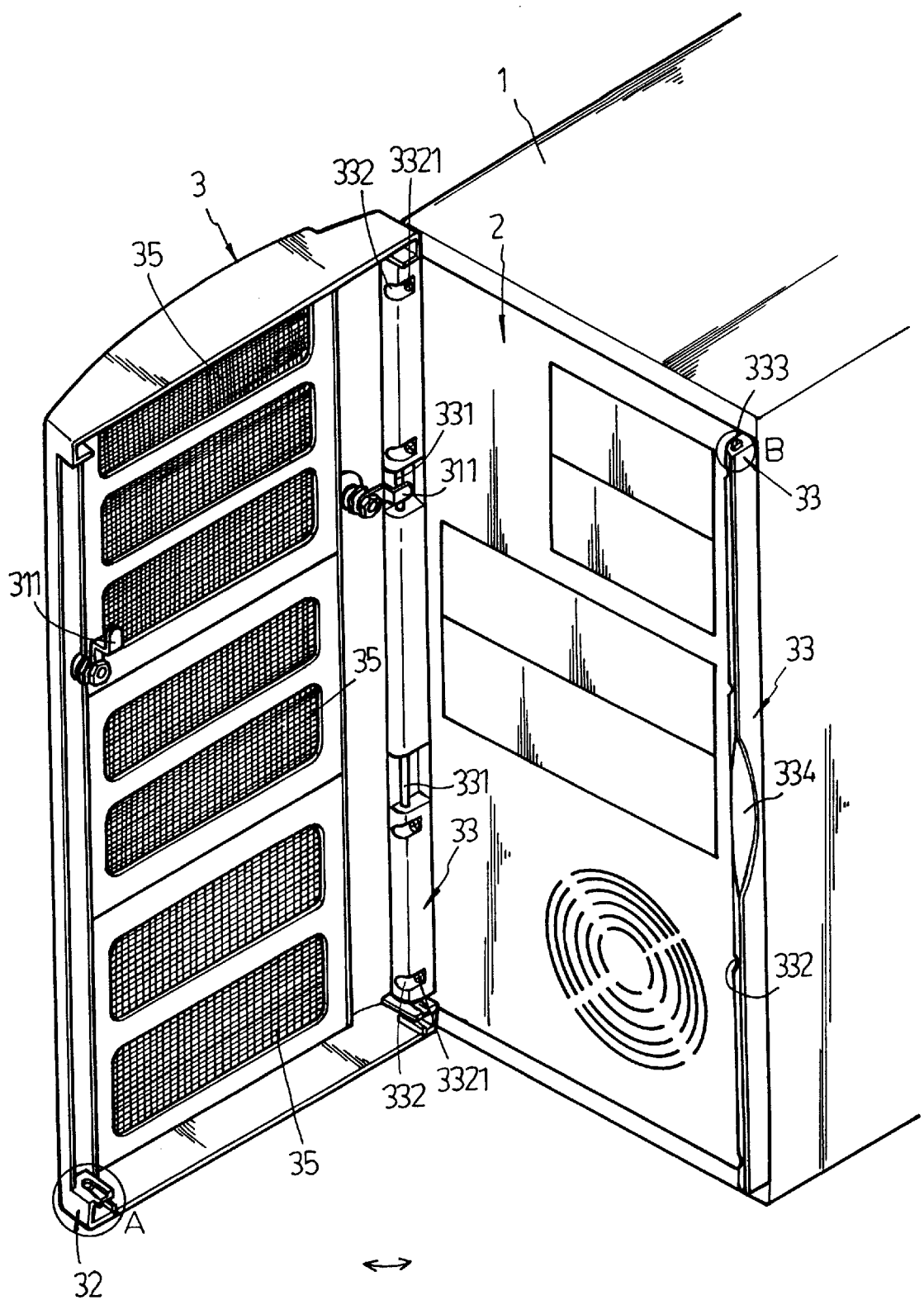
FIG. 2 is another perspective view of the present invention, showing the front cover opened from the face panel.

Referring to FIGS. from 1 through 4, a computer front cover mounting arrangement in accordance with the present invention is generally comprised of a computer mainframe 1 having a face panel 2, and a front cover 3 covered on the face panel 2 to protect the face panel 2 against dust and thieves.

The front cover 3 comprises a plurality of locks 31 symmetrically provided at two opposite lateral sides thereof, four backward coupling flanges 32 respectively disposed in four corners of the back side thereof, a plurality of transverse ornamental ribs 34 and transverse ventilation slots 36 alternatively arranged at the front side thereof at different elevations, and a plurality of wire gauze filters 35 respectively covered on the transverse slots 36. The locks 31 each comprise a swivel hook 311 turned with a particular key between the locking position and the unlocking position. Two locating doorposts 33 are fastened to two opposite vertical lateral sides of the face panel 2. Each locating doorpost 33 comprises two vertical pivot shafts 333 respectively raised from the top and bottom sides in reversed directions, a plurality of mounting holes 332 respectively fastened to the face panel 2 by screws 3321, a plurality of rod-like retaining portions 331 for engagement with the swivel hooks 311 of the locks 31, and a plurality of finger recess 334 through which fingers are inserted to open the front cover 3.

Figure 3:
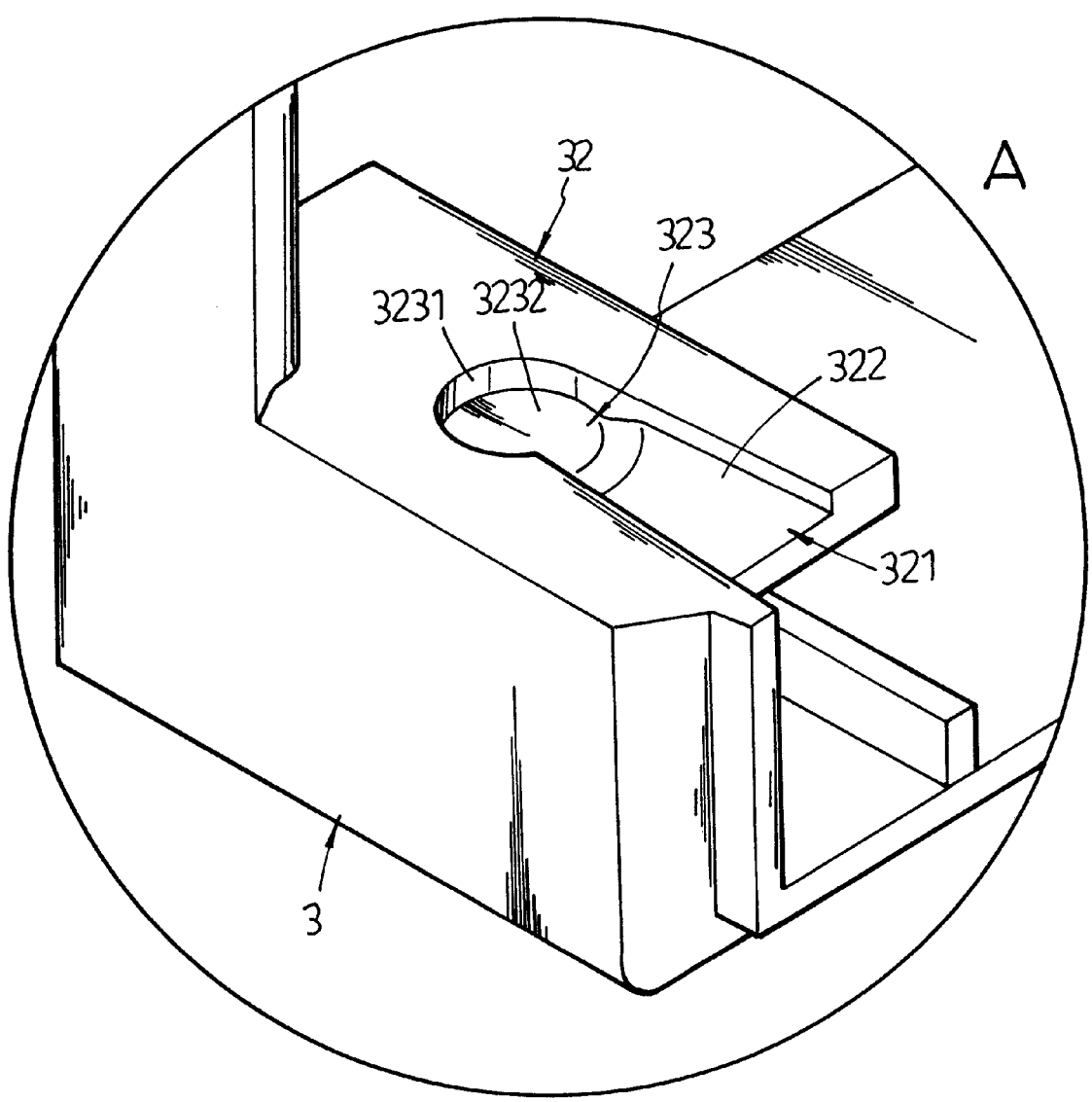
FIG. 3 is an enlarged view of part A of FIG. 2.

Referring to FIG. 3 again, each coupling flange 32 of the front cover 3 comprises a horizontal guide groove 322, a mouth 321 at an outer end of the horizontal guide groove 322, and a circular recess 323 at an inner end of the horizontal guide groove 322. The circular recess 323 has a vertical peripheral wall 3231 at an inner side remote from the horizontal guide groove 322, and a bearing surface 3232 adapted to receive one pivot shaft 333. The guide groove 322 has an outer end terminating in the mouth 321, and an inner end terminating in the circular recess 323. The width of the inner end of the guide groove 322 is smaller than the diameter of the circular recess 323.

Figure 4:
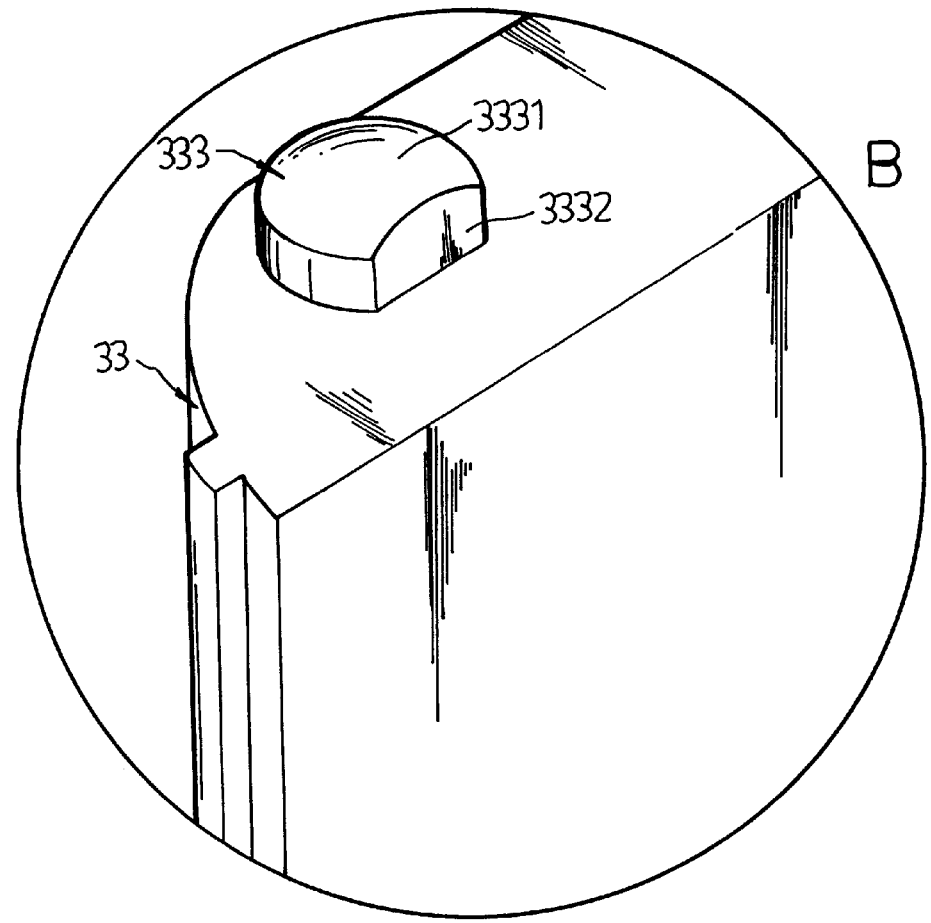
FIG. 4 is an enlarged view of part B of FIG. 2.

Referring to FIG. 4 again, each pivot shaft 333 comprises a peripheral notch 3332, and a convex top face 3331.

Figure 5:
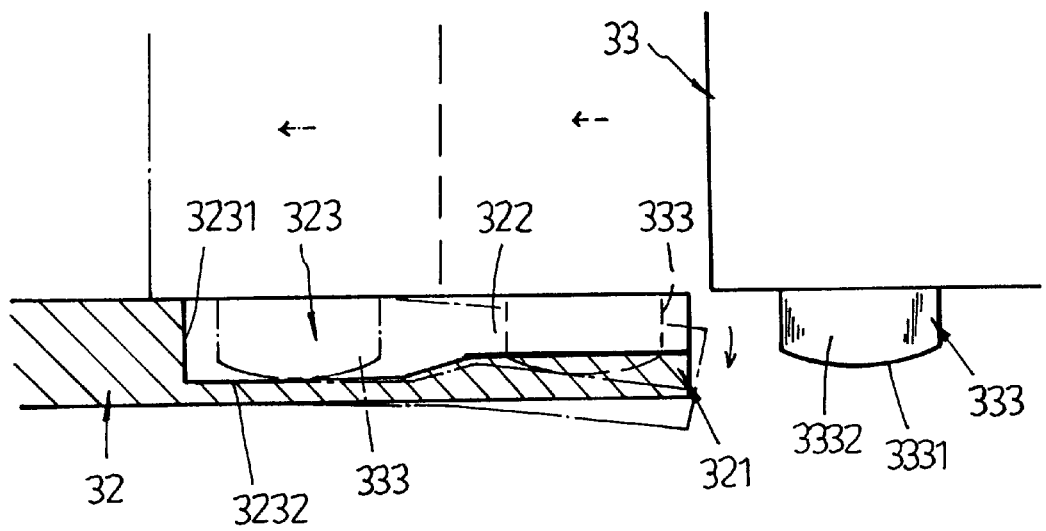
FIG. 5 is a schematic drawing showing the coupling between the front cover and one doorpost according to the present invention.
Figure 6:
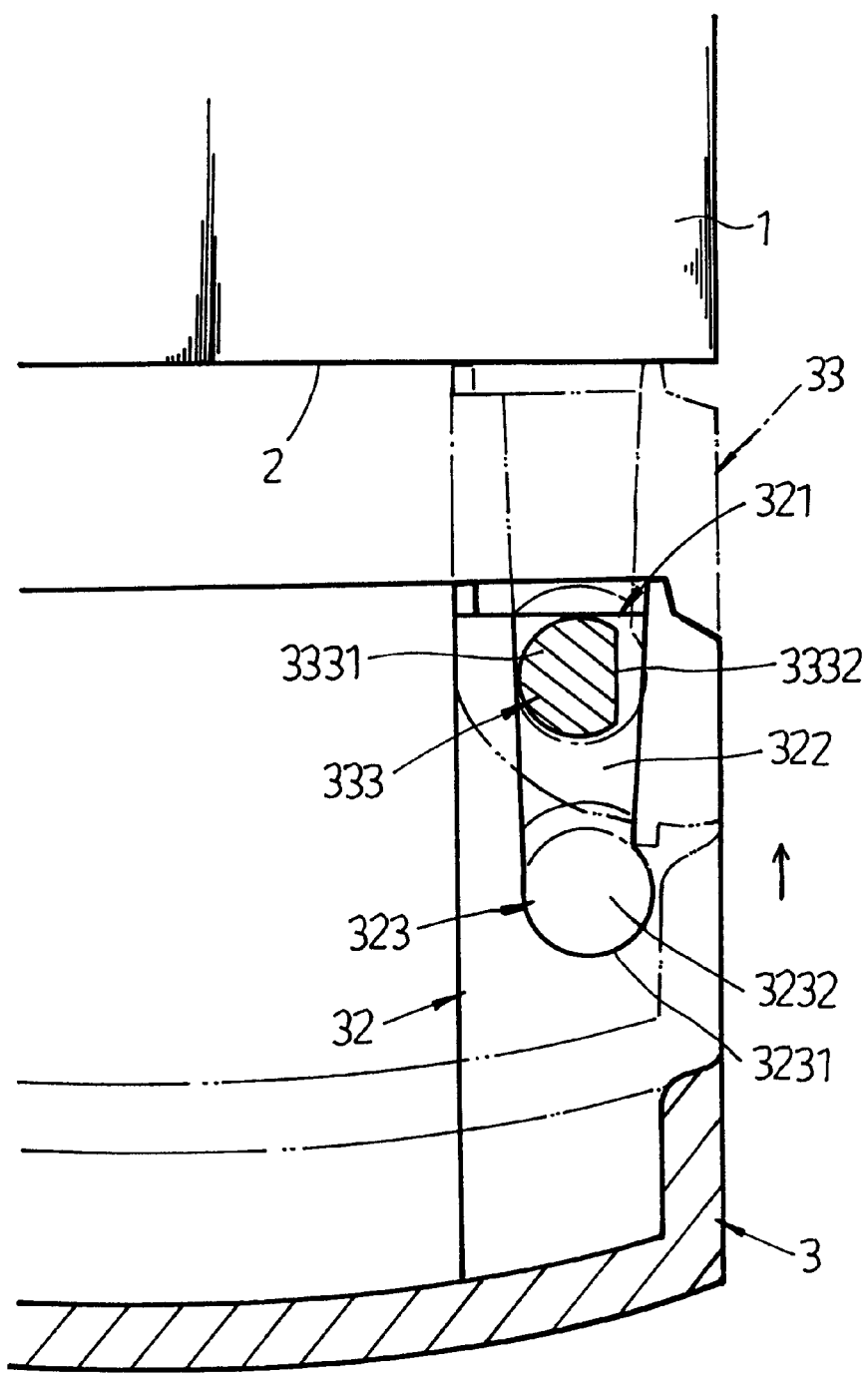
FIG. 6 is a schematic drawing showing the positioning of one pivot shaft in the corresponding coupling flange according to the present invention.

Referring to FIGS. 5 and 6 and FIGS. 3 and 4 again, when the front cover 3 is disposed in parallel to the face panel 2 and then closely attached to the face panel 2, the coupling flanges 32 of the front cover 3 are respectively coupled to the pivot shafts 333 of the doorposts 33, enabling the convex top faces 3331 of the respective pivot shafts 333 to be respectively retained to the bearing surfaces 3232 of the respective circular recesses 323. The diameter of the pivot shafts are approximately equal to the diameter of the circular recesses. When the front cover 3 is closed on the face panel 2, the swivel hooks 311 of the locks 31 are respectively turned with the key to hook on the respective rod-like retaining portions 331 at the doorposts 33.

Figure 7:
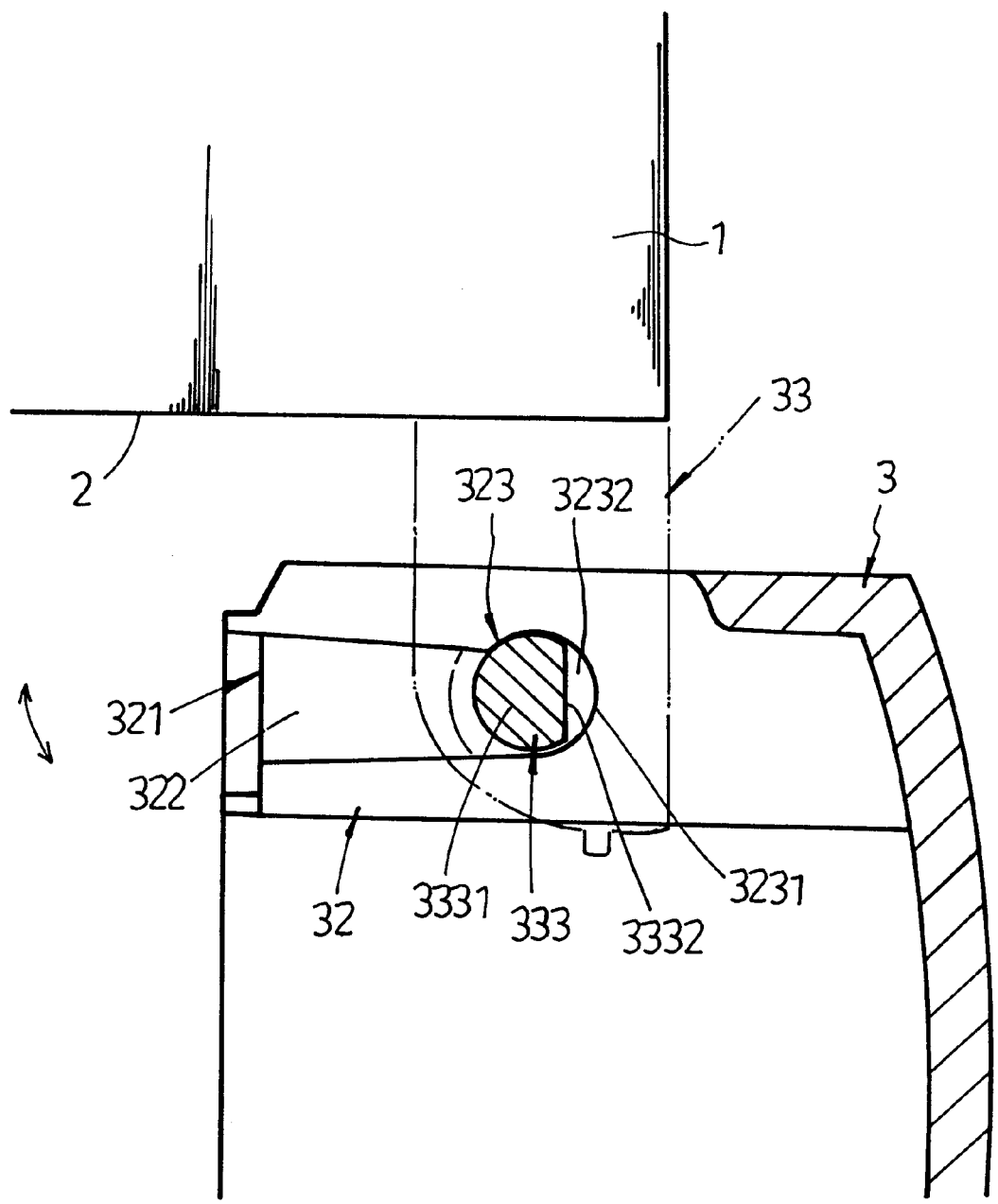
FIG. 7 is a schematic drawing showing the front cover opened from the face panel, the pivot shaft at one doorpost rotated in the respective circular recess.

Referring to FIG. 7 and FIG. 1 again, when the swivel hooks 311 of the locks 31 at one lateral side of the front cover 3 are unlocked, the front cover 3 can then be turned between the closed position and the opened position. When the coupling flanges 32 at one lateral side of the front cover 3 are disengaged from the pivot shafts 333 at one doorpost 33, the pivot shafts 333 or the other doorpost 33 are respectively rotated in the circular recesses 323 of the respective coupling flanges 32, causing the respective peripheral notches 3332 to be disposed perpendicular to the longitudinal axis of the respective guide grooves 322, and therefore the pivot shafts 333 of the other doorpost 33 are firmly retained in the circular recesses 323 of the respective coupling flanges 32 and prohibited from passing through the necks between the circular recesses 323 and the guide grooves 322.

While only one embodiment of the present invention has been shown and described, it will be understood that various modifications and changes could be made thereunto without departing from the spirit and scope of the invention disclosed.

What the invention claimed is:

1. A computer front cover mounting arrangement comprising a face panel fixedly mounted on a front side of a computer mainframe, a front cover covering on said face panel and turnable between a first position where said front cover is closed on said face panel and a second position where said front cover is opened from said face panel, and lock means controlled to lock said front cover with respect to said face panel, wherein said front cover comprises four backward coupling flanges respectively disposed in four corners of a back side thereof, and a plurality of transverse ornamental ribs arranged at a front side thereof at different elevations, said backward coupling flanges each comprising a horizontal guide groove, a mouth at an outer end of said horizontal guide groove, and a circular recess at an inner end of said horizontal guide groove remote from said mouth, said circular recess having a vertical peripheral wall at an inner side remote from said horizontal guide groove and a bearing surface, said guide groove having an outer end terminating in said mouth and an inner end terminating in said circular recess; said face panel comprises two doorposts disposed in parallel at two opposite vertical lateral sides thereof, said doorposts each comprising two vertical pivot shafts respectively raised from top and bottom sides thereof in reversed directions for insertion through the respective mouths at the respective coupling flanges of said front cover into the respective circular recesses, and a plurality of finger recesses on the face panel through which fingers are inserted to open said front cover from said face panel, the pivot shafts of said doorposts each having a peripheral notch, and a convex top face respectively coupled to one of the bearing surfaces of the circular recesses at the coupling flanges of said front cover, the diameter of said pivot shafts being approximately equal to the diameter of the circular recesses at the coupling flanges of said front cover.

2. The computer front cover mounting arrangement of claim 1 wherein said lock means comprises at least two locks provided at two opposite lateral sides of said front cover.

3. The computer front cover mounting arrangement of claim 1 wherein the width of the inner end of the guide groove at each coupling flange of said front cover is smaller than the diameter of the corresponding circular recess.

4. The computer front cover mounting arrangement of claim 1 wherein said front cover further comprises a plurality of ventilation slots, and wire gauze filter means covered on said ventilation slots.

* * * * *